United States Patent
Gilmore et al.

(10) Patent No.: US 9,709,043 B2
(45) Date of Patent: Jul. 18, 2017

(54) CRUSHED SEAL ARRANGEMENT FOR MOTOR ELECTRICAL CONNECTION OF SUBMERSIBLE WELL PUMP

(71) Applicant: Baker Hughes Incorporated, Houston, TX (US)

(72) Inventors: Kevin J. Gilmore, Claremore, OK (US); Jeffrey G. Frey, Broken Arrow, OK (US); Michael R. Rumbaugh, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 287 days.

(21) Appl. No.: 14/510,749

(22) Filed: Oct. 9, 2014

(65) Prior Publication Data

US 2016/0102659 A1  Apr. 14, 2016

(51) Int. Cl.
| | |
|---|---|
| *F04B 47/06* | (2006.01) |
| *F04D 29/08* | (2006.01) |
| *F04D 13/08* | (2006.01) |
| *H02K 5/132* | (2006.01) |
| *F04B 17/03* | (2006.01) |
| *H01R 13/52* | (2006.01) |

(52) U.S. Cl.
CPC .............. *F04B 17/03* (2013.01); *F04B 47/06* (2013.01); *F04D 29/08* (2013.01); *H01R 13/5202* (2013.01); *H02K 5/132* (2013.01); *F04D 13/086* (2013.01)

(58) Field of Classification Search
CPC .... H01R 13/523; H01R 13/533; H01R 13/52; H01R 13/5202; H01R 13/512; E21B 17/028; E21B 17/02; E21B 17/023; H02K 5/225; H02K 5/1285; H02K 5/132; H02K 3/38; F04B 17/03; F04B 47/06; F04B 53/16; F04D 13/08; F04D 13/086; F04D 29/08
USPC ..... 417/423.3; 439/271, 275, 587, 589, 588; 285/368, 331, 332.3; 310/87, 71
See application file for complete search history.

(56) References Cited

U.S. PATENT DOCUMENTS 3,182,280 A * 5/1965 Daut .................... H01R 13/443
                                                    439/148
3,793,610 A * 2/1974 Brishka .............. H01R 13/6277
                                                    439/349

(Continued)

FOREIGN PATENT DOCUMENTS

| GB | 2306258 | 4/1997 |
|---|---|---|
| GB | 2338119 | 12/1999 |

*Primary Examiner* — Nathan Zollinger
(74) *Attorney, Agent, or Firm* — Bracewell LLP; James E. Bradley

(57) ABSTRACT

A submersible well pump assembly has a pump and an electrical motor for driving the pump. The motor has an electrical receptacle with a base and a central bore containing a plurality of motor electrical terminals. An annular groove in the base encircles the central bore and has a closed bottom. A motor lead extends to the motor for supplying power to the motor. An electrical connector on an end of the motor lead has a rim that inserts into the groove. Either the forward edge of the rim or the bottom of the groove is conical, defining an annular void within the groove that is triangular in cross section when the rim is fully inserted into the groove. A seal ring is located in the void of the groove and is deformed by the forward edge of the rim into sealing engagement.

19 Claims, 4 Drawing Sheets

(56) References Cited

U.S. PATENT DOCUMENTS

| | | |
|---|---|---|
| 4,128,735 A | 12/1978 | Zehren |
| 5,567,170 A | 10/1996 | Kroeber |
| 5,667,405 A * | 9/1997 | Holliday .............. H01R 9/0518 439/271 |
| 5,700,161 A | 12/1997 | Plummer et al. |
| 6,443,780 B2 | 9/2002 | Wilbourn et al. |
| 6,676,447 B1 | 1/2004 | Knox |
| 6,780,037 B1 | 8/2004 | Parmeter et al. |
| 7,575,458 B2 * | 8/2009 | Parmeter ............. H01R 13/521 439/271 |
| 7,789,689 B2 * | 9/2010 | Frey .................... H01R 13/523 439/275 |
| 7,806,670 B2 | 10/2010 | Du et al. |
| 7,942,696 B2 * | 5/2011 | Watson ................ E21B 17/023 439/589 |
| 8,398,420 B2 | 3/2013 | Watson |
| 8,491,282 B2 | 7/2013 | Shaver et al. |
| 8,512,074 B2 | 8/2013 | Frey |
| 8,820,798 B2 * | 9/2014 | Campfort ................ F16J 15/02 277/609 |
| 2002/0013093 A1 | 1/2002 | Wilbourn et al. |
| 2008/0096414 A1 | 4/2008 | Hiramatsu |
| 2012/0052721 A1 | 3/2012 | Watson |
| 2014/0144695 A1 | 5/2014 | Rumbaugh et al. |
| 2014/0147301 A1 | 5/2014 | Reeves et al. |
| 2014/0154101 A1 | 6/2014 | Gerrard et al. |

\* cited by examiner

CRUSHED SEAL ARRANGEMENT FOR MOTOR ELECTRICAL CONNECTION OF SUBMERSIBLE WELL PUMP

FIELD OF THE DISCLOSURE

This invention relates to electrical submersible well pumps and particularly to a connection of the motor lead to the motor that has a crushed seal arrangement.

BACKGROUND

Electrical submersible pumps (ESP) are commonly used in oil and gas wells to produce oil and water. A typical ESP includes a pump and a motor to drive the pump. A seal section mounts to the motor to equalize the pressure of the internal motor lubricant with the hydrostatic pressure of the well fluid. Often a string of production tubing in the well supports the ESP and provides a conduit for well fluid to be pumped to the wellhead.

A power cable extends alongside the production tubing to the ESP to supply electrical power to the motor. In many installations, the lower part of the power cable, called a motor lead, has an electrical connector or plug that plugs into a mating receptacle on the motor. Many designs for motor lead electrical connectors exist. Normally, the motor lead connector has three electrical terminals that stab into engagement with three motor electrical terminals. In one type, a gasket on the motor lead connector surrounds the terminals and seals to an inner diameter surface of the receptacle when the connector bolts to the motor receptacle. The gasket provides a barrier between dielectric oil in the motor and well fluid on the exterior of the motor.

If the motor lead connector leaks, the ESP will have to be pulled from the well and repaired or replaced. Retrieving an ESP is expensive, thus reliability of the motor lead connector is important.

SUMMARY

A submersible well pump assembly of this disclosure includes a pump and an electrical motor for driving the pump. An electrical receptacle on the motor has a base with a central bore containing a plurality of motor electrical terminals therein. An annular groove in the base encircles the central bore. The groove has a closed bottom. An elastomeric seal ring is located in the groove. A motor lead extends to the motor for supplying power to the motor. An electrical connector on an end of the motor lead mates with the receptacle. The electrical connector has a housing containing a plurality of electrical conductors, each having a motor lead terminal that electrically connects with one of the motor electrical terminals in the receptacle. A rim on the housing inserts into the groove into deforming engagement with the ring.

Preferably, the groove and a forward portion of the motor lead connector housing are cylindrical. The rim of the housing is located on the forward portion of the housing. In the preferred embodiment, the rim has a forward edge that is conical and in contact with the seal ring.

The groove preferably has concentric inner and outer walls, with a transverse dimension between the inner and outer walls. The rim of the housing has concentric inner and outer wall surfaces that are in contacting engagement with the inner and outer walls of the groove. Preferably, the bottom of the groove is flat and perpendicular to an axis of the central bore. The rim has a forward edge that is conical, defining an annular void between the forward edge and the bottom that is triangular in cross-sectional configuration. The seal ring is located in the void.

The housing of the connector has a stop shoulder that is in abutment with the base of the receptacle, when the connector is connected to the receptacle. A forward edge of the rim is spaced from the bottom of the base while the stop shoulder is in abutment with the base.

The groove may have an inner conical bevel formed at a junction of an inner wall of the groove with the base. Similarly, the groove may have an outer conical bevel formed at a junction of an outer wall of the groove with the base.

Either the bottom of the groove or the forward edge of the rim is conical and the other flat, defining an annular void in the groove that is triangular in cross-section. Preferably, the seal ring has a volume that is within a range from 60% to 85% of a volume of the annular void. Prior to being deformed by the rim, the seal ring has a cylindrical configuration in transverse cross-section.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Figure 1:
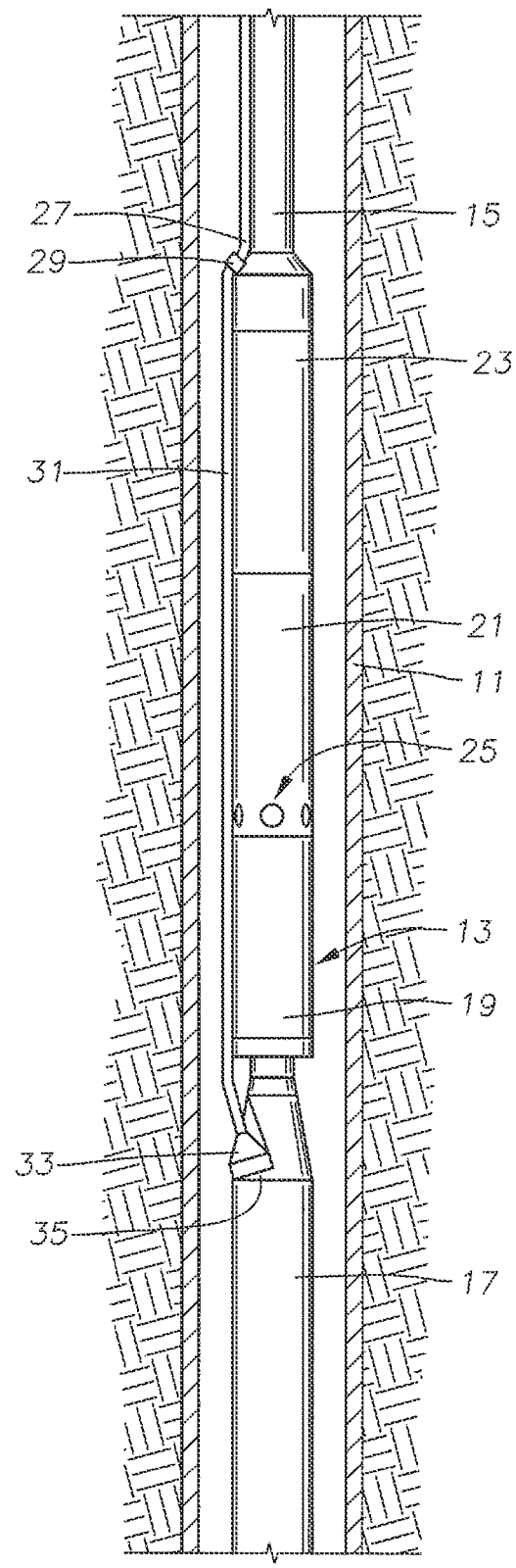
FIG. 1 is a side view of an electrical submersible pump assembly according to an embodiment of the present invention shown disposed in a well.

FIG. 1 is an elevational section view of a cased well 11 having electrical submersible pumping system (ESP) 13 disposed therein on a string of production tubing 15. ESP 13 includes an electric motor 17, a seal/equalizer section 19, an optional gas separator 21, and a pump 23. Pump 23 may comprise a centrifugal pump or another type, such as a progressing cavity pump. Fluid inlets 25 are shown provided on separator 21 for providing a passage for receiving fluid into pump 23. A power cable 27 extends downhole alongside tubing 15, terminating in a splice or connection 29 that electrically couples power cable 27 to a motor lead 31, which may be considered to be part of power cable 27. Motor lead 31 has a pothead or motor connector 33 on its lower end that electrically connects and secures motor lead 31 to receptacle 35 of electric motor 17. Alternately, power cable 27 can extend all the way from the surface to motor connector 33, thereby eliminating the need for cable connection 29.

Figure 2:
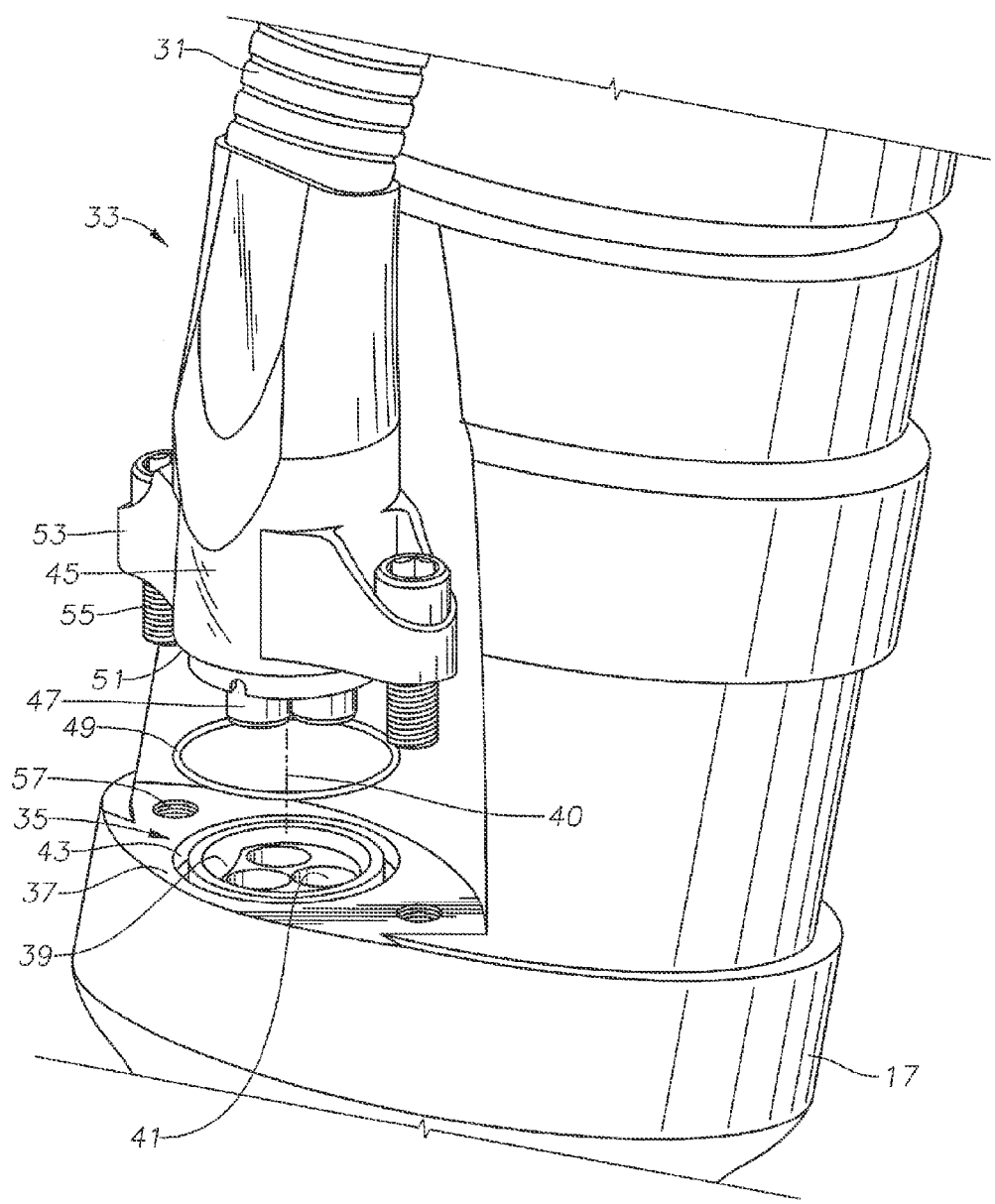
FIG. 2 is perspective view of a motor lead connector being connected to the motor of the pump assembly of FIG. 1.

FIG. 2 shows motor connector 33 positioned to connect to motor receptacle 35. Receptacle 35 has a flat base 37 formed on the head of motor 17, preferably at an angle oblique to the longitudinal axis of motor 17. A central bore 39 with an axis 40 extends from base 37 into the interior of motor 17. A plurality of motor terminals 41, which may be either male or female, are mounted with central bore 39 and connected to motor wiring of the stator (not shown). Motor 17 is normally a three-phase motor, resulting in three motor terminals 41 spaced 120 degrees from each other relative to axis 40 of central bore 39. Central bore 39 is normally cylindrical. An annular recess or groove 43 is formed in base 37 surrounding and radially spaced from central bore 39 relative to axis 40. Groove 43 is preferably cylindrical and coaxial with central bore 39.

Motor connector 33 has a housing 45 with a forward or lower cylindrical portion. Motor lead electrical connector terminals 47 are mounted within housing 45 for mating with and electrically engaging motor terminals 41. A seal 49 locates within groove 43. Seal 49 may be formed of any elastomeric, including rubber or plastic materials, or a metal material suitable for operation with ESP 13 in a well. Housing 45 has a cylindrical rim 51 that inserts into groove 43 and into abutment with seal 49. A pair of flanges 53 extend from opposite sides of housing 45. Bolts 55 extend through flanges 53 into threaded holes 57 in base 37 to secure motor connector 33 tightly to base 35. Tightening bolts 55 causes rim 51 to deform or crush seal 49 into sealing engagement with rim 51 and groove 43.

Figure 3:
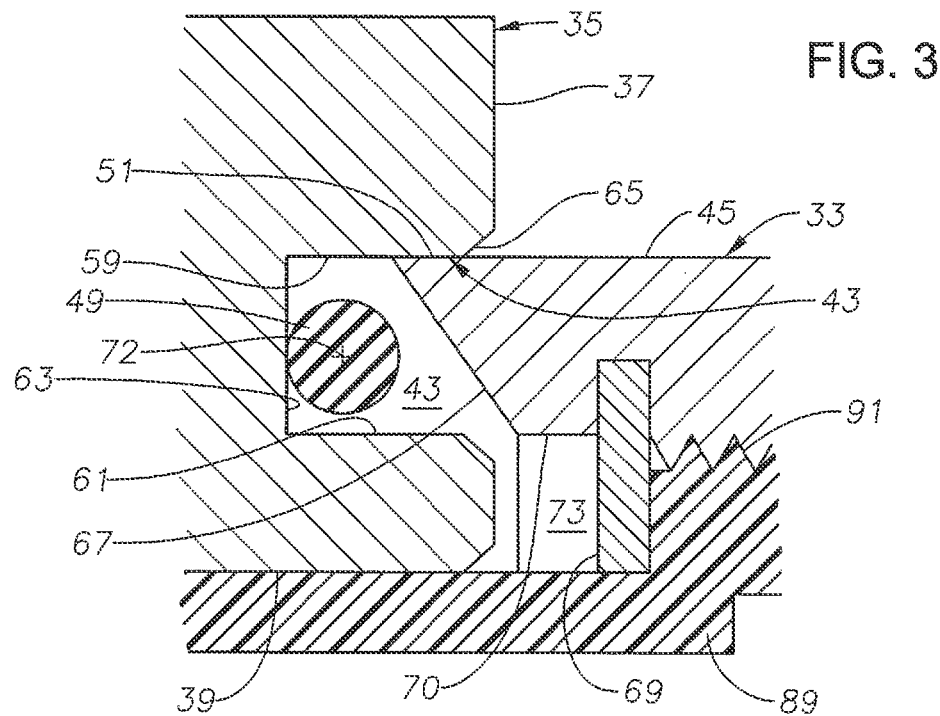
FIG. 3 is an enlarged partial sectional view of the motor lead connector of FIG. 2 being connected to an electrical receptacle on the motor.

Referring to FIG. 3, groove 43 has a cylindrical outer wall 59 and a concentric cylindrical inner wall 61 radially inward from outer wall 59 relative to axis 40 (FIG. 2) of central bore 39. Groove 43 has a closed bottom 63 that is preferably flat and in a plane perpendicular to axis 40 and parallel with base 37. The depth of groove 43 from base 37 to bottom 63 may vary; in this example, the depth is greater than the radial distance from outer wall 59 to inner wall 61. An annular conical bevel 65 may be formed at the junction of outer wall 59 with base 37, and a similar bevel 65 may be formed at the junction of inner wall 61 with base 37. Bevels 65 facilitate stabbing rim 51 of motor connector 33 into groove 43.

Housing rim 51 has a lower or forward edge 67 that extends from an outer diameter wall surface 68 of housing 45 to an inner diameter wall surface 70 of housing 45. In this example, forward edge 67 is conical, slanting inward and downward toward central bore axis 40 (FIG. 2), but the slope could be outward and upward from axis 40 instead. The preferred angle of forward edge 67 relative to central bore axis 40 is 45 degrees. Alternately, forward edge 67 could be flat and groove bottom 63 conical. Housing outer wall surface 68 is only a few thousandths of an inch smaller than the diameter of groove outer wall 59, thus will be in engagement with groove outer wall 59 when connector 33 is connected. Housing inner wall surface 70 is only a few thousandths of an inch greater than the diameter of groove inner wall 61, thus will be in contact with groove inner wall 61 when connector 33 is connected.

Housing 45 has a stop that limits the extent of insertion of rim 51 into groove 43. In this embodiment, the stop comprises an internal shoulder 69 located within housing 45. A stop on the exterior of housing 45 would alternately be feasible. Internal shoulder 69 abuts receptacle base 37 at a point that positions the tip of forward edge 67 a short distance rearward from groove bottom 63.

Seal 49 may differ in transverse cross sectional and un-deformed shape when viewed in a transverse plane passing normal through an annular center line 72. Prior to deforming seal 49, its annular center line 72 need not be centered between groove inner and outer walls 61, 59. In this example, annular center line 72 is closer to groove inner wall 61 than outer wall 59 prior to seal 49 being set; however, annular center line 72 could alternately be located approximately midway between groove inner wall 61 and groove outer wall 59 before seal 49 is set. Preferably the transverse cross sectional shape while un-deformed is cylindrical as shown in FIG. 3, similar to an o-ring. In this example, the inner diameter of seal 49 while un-deformed is slightly smaller than the diameter of groove inner wall 61. The outer diameter of seal 49 while un-deformed is less than the diameter of outer wall 59. The transverse cross-sectional diameter of seal 49 through center line 72 while un-deformed is considerably less than the radial dimension of groove 43 between outer wall 59 and inner wall 61. The transverse cross-sectional diameter of seal 49 through center line 72 while un-deformed is considerably less than the depth of groove 43.

Figure 4:
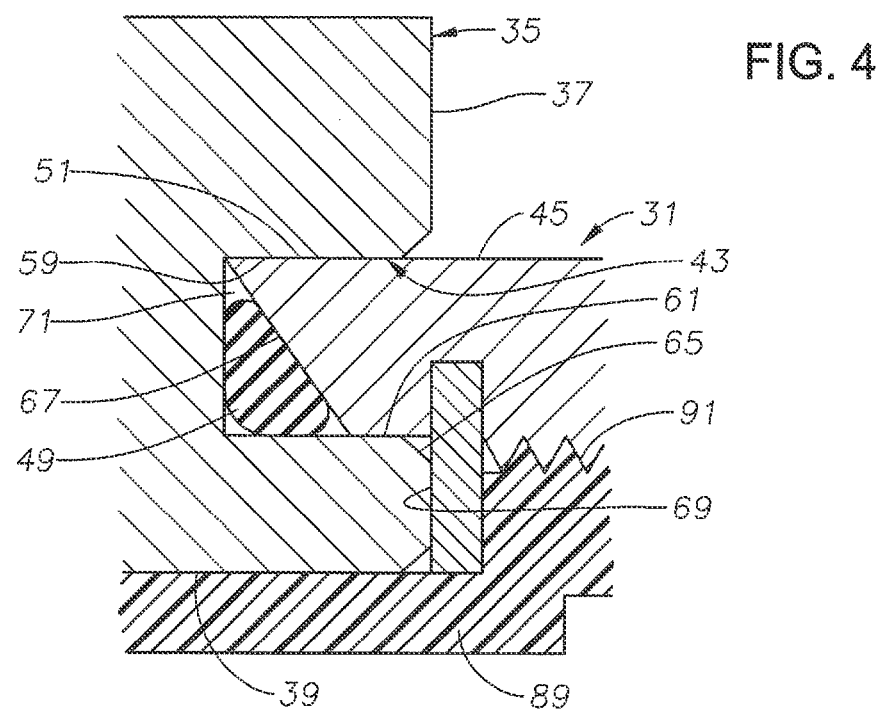
FIG. 4 is a partial sectional view of the motor lead connector of FIG. 2, as shown in FIG. 3, but fully connected to the electrical receptacle.

As shown in FIG. 4, when internal shoulder 69 abuts receptacle base 37, an annular triangular-shaped void 71 will exist between rim forward edge 67 and groove bottom 63. Forward edge 67 deforms seal 49, causing seal 49 to flow into a generally triangular shape in transverse cross-section, similar to void 71. A portion of seal 49 seals against groove bottom 63, a portion against groove inner wall 61, and a portion against forward edge 67. The sealing engagement of seal 49 prevents dielectric lubricant within central bore 39 from leaking outward past housing 45. The sealing engagement also prevents well fluid on the exterior of motor connector 33 from leaking inward past seal 49 into receptacle central bore 39. The volume of seal 49 does not shrink while being deformed; rather the volume remains constant. The dimensions of seal 49 result in the volume of seal 49 filling about 80% of the volume of void 71. The range may differ, such as between 60% and 85%. In the fully secured position of FIG. 4, the tip of housing forward edge 67 is spaced a short distance from groove bottom 63.

Figure 5:
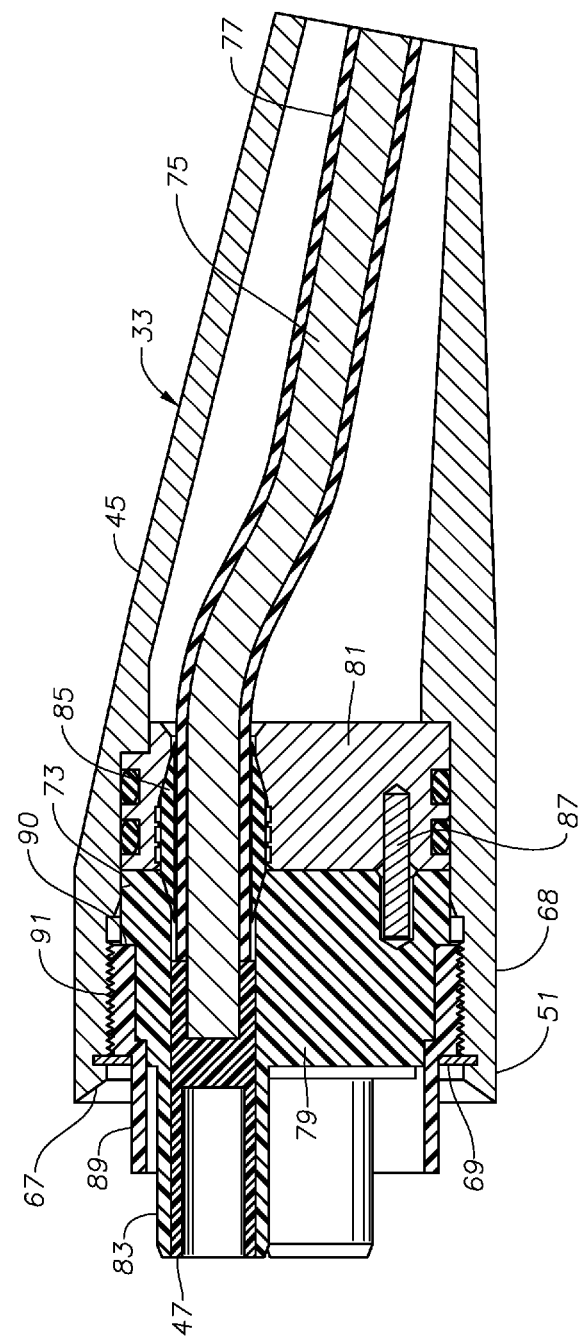
FIG. 5 is a sectional view of the motor lead connector of FIG. 2.

FIG. 5 is a longitudinal cross sectional view of motor connector 33. The components shown are more thoroughly described in U.S. Pat. No. 8,512,074. Other types of pothead connectors are also feasible. Connector housing 45 has a cavity 73 into which electrical conductors or wires 75 of motor lead 31 (FIG. 1) extend. Conductors 75 have one or more insulation layers 77, and optionally may have a lead sheath (not shown). A forward electrical insulation block 79 and a rearward electrical insulation block 81 mount within a cylindrical portion of housing cavity 73. Forward insulation block 79 has three cylindrical projections or extensions 83 extending forward past housing 45. Each insulated conductor 75 extends through aligned holes in insulation blocks 79, 81, registering with one of the projections 83. One of the connector terminals 47 joins each conductor 75 and locates within one of the projections 83. Sealing boots 85 optionally may seal insulated conductors 75 within the holes in insulation blocks 79, 81. An alignment pin 87 aligns the three conductor holes in insulation blocks 79, 81 during assembly of motor connector 33.

A retaining nut 89, typically formed of a rigid electrical insulation material, has external threads 91 that secure to mating threads within housing cavity 73. Retaining nut 89 has a rearward shoulder 90 that abuts a forward facing shoulder on forward insulation block 79 to axially compress insulation blocks 79, 81 within housing 45. Retaining nut 89 projects forward from housing rim 51 for close reception in receptacle central bore 39 (FIG. 3). In this example, projections 83 extend farther than retaining nut 89. Internal stop shoulder 69 may comprise a snap ring that fits into a groove in housing cavity 73 to retain nut 89. Epoxy (not shown) may be injected and cured within housing cavity 73 rearward from rearward insulation block 81, filling the spaces surrounding insulated conductors 75.

To connect motor connector 33 to receptacle 35, a technician places seal 49 in groove 43, as shown in FIGS. 2 and 3. The technician then pushes motor connector 33 forward, causing connector terminals 47 to slide into engagement with motor terminals 41. Retaining nut 89 enters receptacle central bore 39 as terminals 47, 41 begin, to engage. Continued forward movement of motor connector 33 causes housing rim 51 to enter groove 43, as shown in FIG. 3. Forward edge 67 contacts seal 49, deforming it to the configuration shown in FIG. 4.

During operation, motor 17 drives pump 23. Dielectric lubricant in motor 17 may be in fluid communication with receptacle central bore 39, but will be sealed by seal 49. Motor 17 will be submersed in well fluid, and seal 49 will prevent encroachment into central bore 39.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A submersible well pump assembly, comprising:
   a pump;
   an electrical motor operatively connected with the pump for driving the pump;
   an electrical receptacle on the motor, having a base with a central bore having an axis and containing a plurality of motor electrical terminals therein;
   an annular groove in the base encircling the central bore, the groove having inner and outer walls spaced radially outward from the central bore, the inner and outer walls being joined by a closed bottom;
   a seal ring located in the groove;
   a motor lead extending to the motor for supplying power to the motor;
   an electrical connector on an end of the motor lead that mates with the receptacle, the electrical connector having a housing with a central cavity containing a plurality of electrical conductors, each having a motor lead terminal that electrically connects with one of the motor electrical terminals in the receptacle;
   a rim on the housing that inserts into the groove and has a forward edge that is in deforming engagement with the seal ring, the rim having an outer wall surface that slidingly engages the outer wall of the groove and an inner wall surface that slidingly engages the inner wall of the groove as the rim inserts into the groove;
   a stop shoulder in the central cavity that is rearward from the forward edge and positioned to contact an inner portion of the base between the central bore and the inner wall of the groove while the forward edge of the rim is rearward from the bottom of the groove; and wherein
   the forward edge of the rim is conical, defining an annular void within the groove that contains the seal ring and is triangular in cross section when the rim is fully inserted into the groove.

2. The assembly according to claim 1, wherein:
   the forward edge defines a forward tip; and
   when the rim is fully inserted into the groove, an annular space that is triangular in transverse cross section exists between the tip and the seal ring.

3. The assembly according to claim 1, wherein the forward edge slopes rearwardly from the outer wall surface of the rim; and
   when the rim is fully inserted into the groove and the seal ring deformed, an outer diameter of the seal ring is less than the diameter of the outer wall surface of the rim.

4. The assembly according to claim 1, wherein:
   the forward edge slopes rearwardly from the outer wall surface of the rim; and
   when the rim is fully inserted into the groove and the seal ring deformed, an outer annular space is bounded by an outer diameter of the seal ring, the forward edge of the rim, and the outer wall of the groove.

5. The assembly according to claim 4, wherein:
   when the rim is fully inserted into the groove and the seal ring deformed, an annular inner space is bounded by the seal ring, the inner wall of the groove and the forward edge of the rim.

6. The assembly according to claim 1, further comprising:
   a retaining nut secured within the housing by threads to retain the motor lead terminals; and wherein
   the stop shoulder comprises a ring that has an outer edge located in an annular recess in the central cavity of the housing and abuts a side of the retaining nut.

7. The assembly according to claim 1, wherein:
   the forward edge slopes rearwardly from the outer wall surface of the rim; and
   when the rim is fully inserted into the groove and the seal ring deformed, an outer diameter of the seal ring is less than the diameter of the outer wall surface of the rim, and an inner diameter of the seal ring equals the diameter of the inner wall surface of the rim.

8. The assembly according to claim 1, wherein:
   the seal ring has a volume that is within a range from 60% to 85% of a volume of the annular void.

9. The assembly according to claim 1, wherein:
   prior to being deformed by the rim, the seal ring has a cylindrical configuration in transverse cross-section, and after being deformed by the rim, the seal ring has an outer diameter that is less than an inner diameter of the outer wall of the groove.

10. A submersible well pump assembly, comprising:
    a pump;
    an electrical motor operatively connected with the pump for driving the pump;
    an electrical receptacle on the motor, having a base with a central bore containing a plurality of motor electrical terminals therein;
    an annular groove in the base encircling the central bore, the groove having inner and outer cylindrical walls and a closed bottom spaced radially outward from the central bore relative to an axis of the central bore;

a motor lead extending to the motor for supplying power to the motor;

an electrical connector on an end of the motor lead that mates with the receptacle, the electrical connector having a housing with a central cavity containing a plurality of electrical conductors, each having a motor lead terminal that protrudes forward from the housing and electrically connects with one of the motor electrical terminals in the receptacle;

a rim on the housing that inserts into the groove, the rim having inner and outer wall surfaces that engage the inner and outer walls, respectively, of the groove;

at least one of a forward edge of the rim and the bottom of the groove being conical, defining an annular void within the groove that is triangular in cross section when the rim is fully inserted into the groove;

a seal ring located in the void of the groove; wherein the forward edge of the rim engages and deforms the seal ring into sealing engagement between the groove and the rim when the rim is fully inserted into the groove; and a stop shoulder located in the central cavity and positioned rearward from the forward edge of the rim to contact an inner portion of the base between the central bore and the groove while the forward edge of the rim is rearward from the bottom of the groove.

11. The assembly according to claim 10, wherein:

the forward edge of the rim is conical and extends rearward from a tip at the outer wall surface of the rim; and a distance from the stop shoulder to the tip is less than a distance from the inner portion of the base to the bottom of the groove.

12. The assembly according to claim 11, wherein:

after the rim is fully inserted into the groove and the seal ring deformed, an annular space exists between an outer diameter of the seal ring and the outer wall of the groove.

13. The assembly according to claim 11, wherein:

after the rim is fully inserted into the groove and the seal ring deformed, an annular outer space exists between an outer diameter of the seal ring and the tip of the forward edge, and an annular inner space exists between an inner diameter of the seal ring and the forward edge at the inner wall surface of the rim.

14. The assembly according to claim 10, wherein:

the seal ring has a transverse cross-section that is cylindrical prior to the seal ring being deformed, having an inner diameter that is greater than a diameter of the inner wall of the groove and an outer diameter less than a diameter of the outer wall of the groove.

15. The assembly according to claim 10, the seal ring has a volume that is within a range from 60% to 85% of a volume of the annular void.

16. A submersible well pump assembly, comprising:

a pump;

an electrical motor operatively connected with the pump for driving the pump;

an electrical receptacle on the motor, having a flat base with a central bore containing a plurality of motor electrical terminals therein;

a circular annular groove in the base encircling the central bore, the groove having concentric cylindrical inner and outer walls terminating in a flat bottom and spaced radially outward from the central bore relative to an axis of the central bore;

a seal ring located in the groove;

a motor lead extending to the motor for supplying power to the motor;

an electrical connector on an end of the motor lead that mates with the receptacle, the electrical connector having a housing containing a plurality of electrical conductors, each having a motor lead terminal that electrically connects with one of the motor electrical terminals in the receptacle;

a cylindrical rim on a forward end of the housing that inserts into the groove and deforms the seal ring against the bottom of the groove, the rim having an outer diameter surface that engages the outer wall of the groove and an inner diameter surface that engages the inner wall of the groove, the rim having a forward edge that is conical, extends from the outer diameter surface to the inner diameter surface and slopes in a rearward direction, defining a tip of the forward edge at the outer diameter surface; and a shoulder protruding radially inward from the inner diameter surface of the rim that abuts a inner portion of the base between the central bore and the groove when the rim is fully inserted into the groove, wherein a distance from the shoulder to the tip of the forward edge of the rim is less than a distance from the bottom of the groove to the inner portion of the base to position the tip of the forward edge of the rim from the bottom of the groove when the rim is fully inserted into the groove.

17. The assembly according to claim 16, wherein after the rim is fully inserted into the groove and the seal ring deformed, an annular outer cavity exists between an outer diameter of the seal ring and the tip of the forward edge of the rim, and an annular inner cavity exists between an inner diameter of the seal ring and the forward edge of the rim at the inner diameter surface of the rim.

18. The assembly according to claim 16, wherein the seal ring is cylindrical in transverse cross section prior to insertion of the rim into the groove, the seal ring having an inner diameter greater than a diameter of the inner wall of the groove and the seal ring has an outer diameter smaller than a diameter of the outer wall of the groove after the rim is fully inserted into the groove and the seal ring deformed.

19. The assembly according to claim 16, wherein after the rim is fully inserted into the groove and the seal ring deformed, the seal ring has a diameter that is less than an outer diameter of the outer wall of the groove.

* * * * *